United States Patent [19]
Matsuda et al.

[11] Patent Number: 5,249,088
[45] Date of Patent: Sep. 28, 1993

[54] CASSETTE LOADING APPARATUS WITH RESILIENT GUIDE SLOT FOR PREVENTION OF JAMMING

[75] Inventors: Takashi Matsuda; Kei Shirahata, both of Sanda, Japan

[73] Assignee: Mitsubishi Denki Kabushiki Kaisha, Tokyo, Japan

[21] Appl. No.: 627,159

[22] Filed: Dec. 13, 1990

[30] Foreign Application Priority Data

Dec. 14, 1989 [JP] Japan .................. 1-322510

[51] Int. Cl.$^5$ .................. G11B 15/60; G11B 15/675
[52] U.S. Cl. .................. 360/96.5; 360/93
[58] Field of Search .................. 360/93, 96.5, 96.6; 242/197–199

[56] References Cited

U.S. PATENT DOCUMENTS

| | | | |
|---|---|---|---|
| 4,796,117 | 1/1989 | Fleck | 360/96.5 |
| 4,799,117 | 1/1989 | Ohyama | 360/96.5 |
| 4,858,849 | 8/1989 | Okamura et al. | 242/199 |
| 5,008,766 | 4/1991 | Chigasaki | 360/96.5 |
| 5,032,939 | 7/1991 | Mihara et al. | 360/96.5 |

FOREIGN PATENT DOCUMENTS 1132852  5/1989  Japan .

*Primary Examiner*—A. J. Heinz
*Assistant Examiner*—Jefferson Evans
*Attorney, Agent, or Firm*—Rothwell, Figg, Ernst & Kurz

[57] ABSTRACT

A cassette loading apparatus for a cassette playing-/recording apparatus such as a DAT, VCR, or optical disc apparatus, includes guide slots in a frame for guiding a cassette holder between an insertion position and a loading position, and an opening-closing guide slot for guiding a link lever coupled to a release lever for opening and closing a lid on the cassette as the cassette holder moves between the insertion and loading positions. The opening-closing guide slot includes a yieldable arm for guiding the link lever along the guide slot during normal operation, and for flexing downward in the event that the cassette lid accidentally disengages from the release lever when moving from the loading position, so as to prevent the cassette from becoming jammed in the apparatus and to allow the cassette to be transferred to the insertion position from which it can be removed.

6 Claims, 10 Drawing Sheets

CASSETTE LOADING APPARATUS WITH RESILIENT GUIDE SLOT FOR PREVENTION OF JAMMING

BACKGROUND OF THE INVENTION

This invention relates to a cassette loading apparatus having a cassette holder containing in a frame thereof a cassette including a lid and being movable between a cassette insertion position and a cassette loading position.

Figure 14:
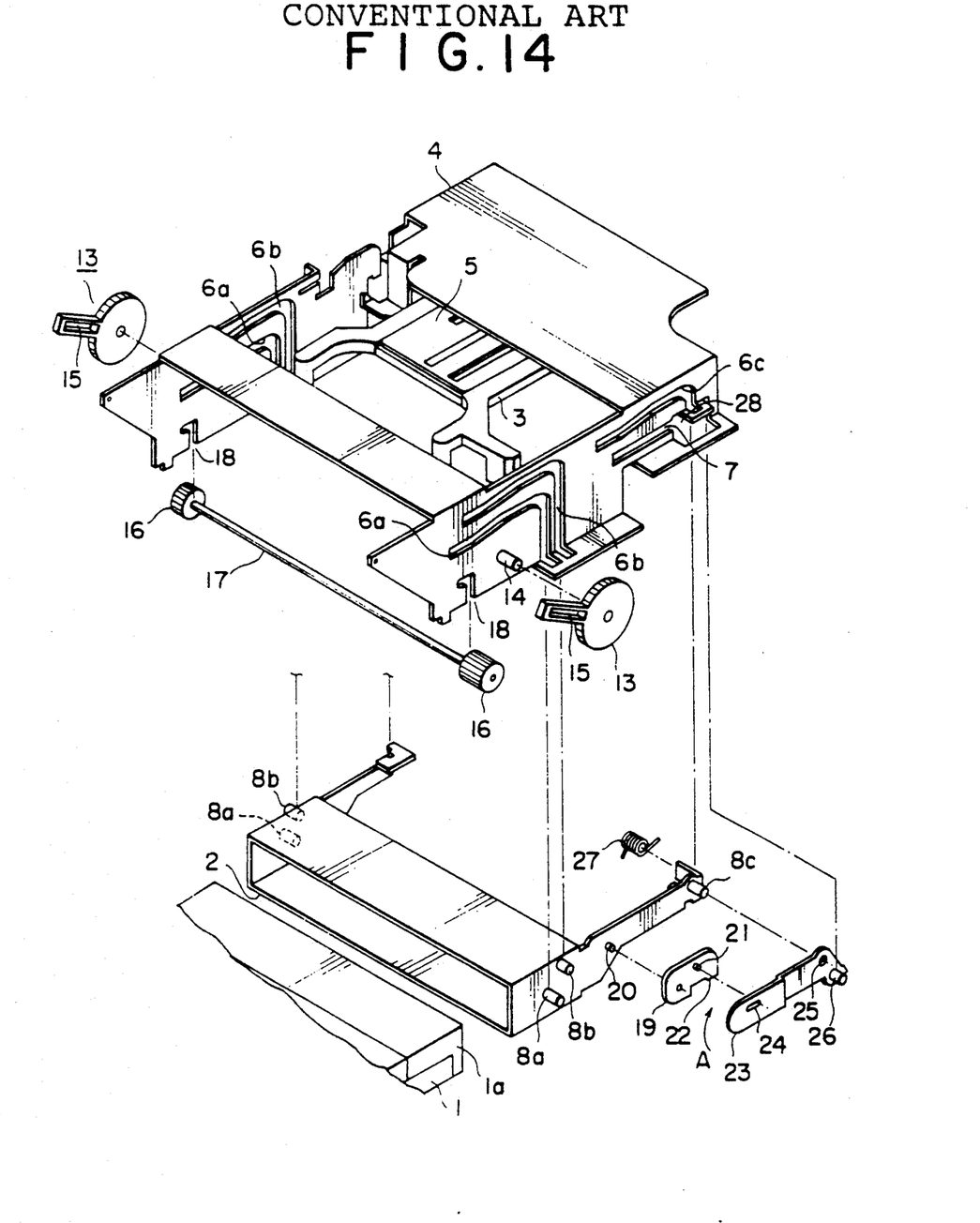
FIG. 14 is an exploded perspective view of a main portion of one example of a conventional DAT cassette loading apparatus.

FIG. 14 is an exploded perspective view of a main portion of a DAT (Digital Audio Tape) recorder disclosed in Japanese Patent Application No. 1-132852 filed on May 29, 1989 by the same assignee as the present application, in which 1 is a cassette in which a magnetic tape is housed, 1a is a lid biased in a closed position by a spring (not shown) within the cassette 1, 2 is a cassette holder for containing the cassette 1 therein and movable between a cassette insertion position and a cassette loading position relative to a frame 4, 3 is a slide lever movable within the frame 4 when engaged and pushed by a front end portion of the cassette 1, 4 is the frame disposed outside of the slide lever 3 and having a substantially U-shaped cross-section, 5 is a slide plate movably mounted to an inner surface of the frame 4 and placed over the slide lever 3, 6a and 6b are a substantially L-shaped first and a second guide slot formed in the front portion of a side wall of the frame 4, 6c is substantially L-shaped third guide slot formed in the rear portion of the side wall of the frame 4, 7 is an opening-closing guide slot formed below the third guide slot 6c and having a release slot 28, 8a and 8b are a first and a second guide pin mounted on the front portion of the side walls of the cassette holder 2 and movable along the first and the second guide slots 6a and 6b, respectively, and 8c is a third guide pin mounted on the rear portion of both sides of the cassette holder 2 and movable along the third guide slot 6c.

13 is an arm gear disposed outside of both sides of the frame 4 and rotatable about a shaft 14, 15 is a play hole formed in the tip portion of the arm gear through which the first and the second guide pins 8a and 8b extend, 16 is a synchronous gear meshing with the arm gear 13 for driving the arm gear 13, 17 is a synchronous shaft to which the synchronous gears 16 are mounted and which is engaged with the release groove 18.

Figure 15:
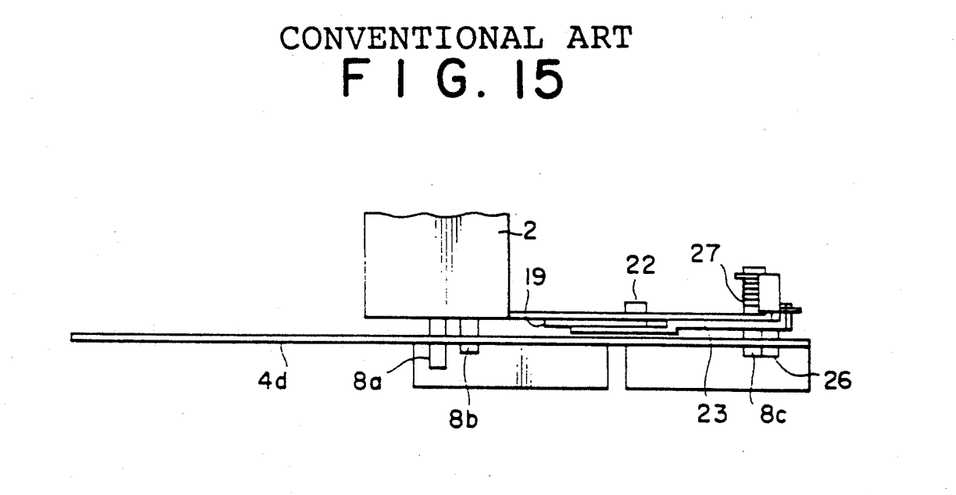
FIG. 15 is a plan view of the main portion of the conventional cassette loading apparatus illustrated in FIG. 14.
Figure 16:
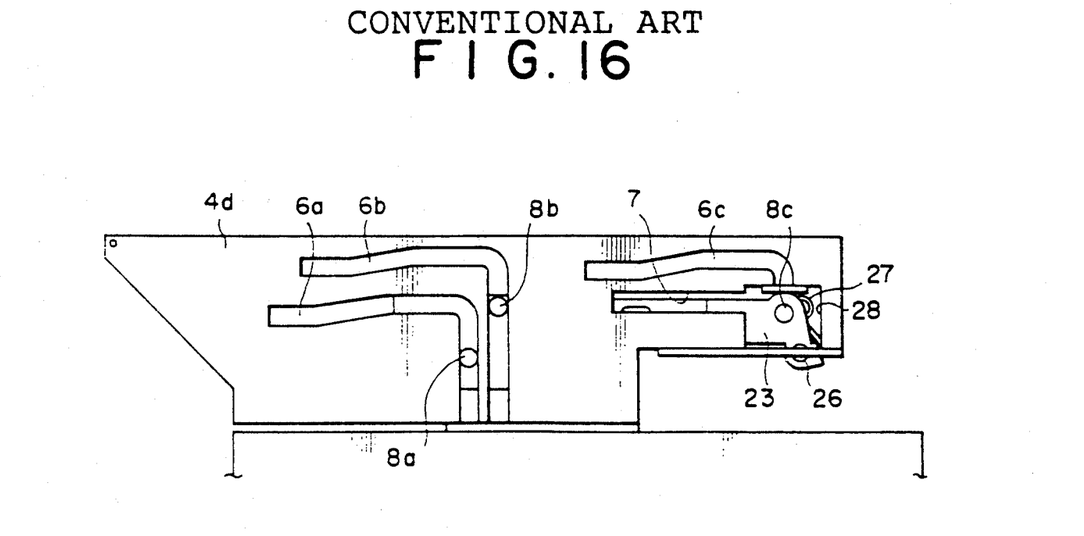
FIG. 16 is a side view of the main portion of the conventional cassette loading apparatus illustrated in FIG. 14.

FIG. 15 is a plan view of a main portion of FIG. 14, and FIG. 16 is a side view of FIG. 15, in which 19 is a release lever pivotally supported on a pivot pin 20 of the cassette holder 2 and having a link pin 21 and a claw portion 22, and constituting, together with a link lever which will be described later, an opening-closing lever, 23 is a link lever having a link slot 24 through which the link pin 21 extends and a support hole 25 through which a third guide pin 8c extends and also having an opening-closing guide pin 26 movable along the opening-closing guide slot 7, 27 is a spring pressing at one end a base end portion of the link lever 23 and urging at the other end a base end portion of the cassette holder 2 to always bias the link lever 23 in the direction of an arrow A in FIG. 14.

Next, the operation of the conventional DAT recorder as explained above will be described. Upon loading the cassette 1, the cassette 1 is first inserted into the cassette holder 2, upon which the cassette 1 abuts the tip portion of the slide lever 3 and held in the cassette holder 2.

Figure 17:
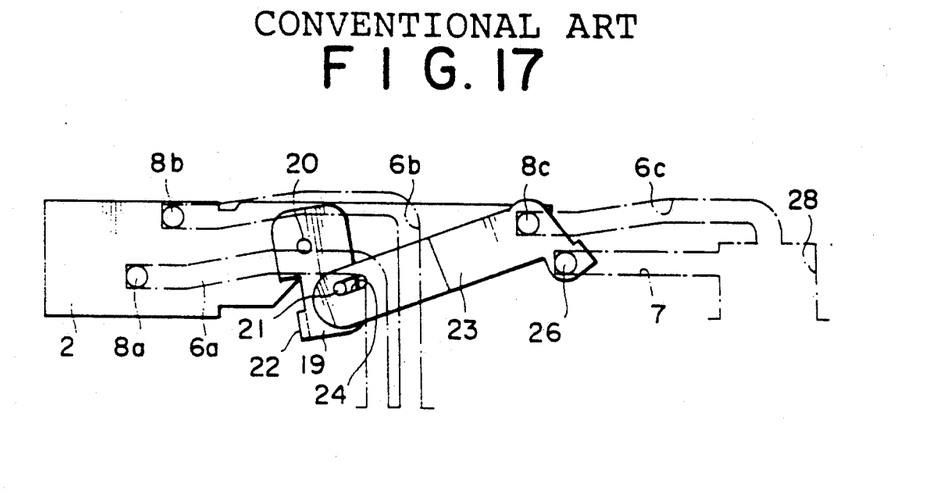
FIGS. 17 to 21 are side views illustrating various operation positions of the main portion of the conventional DAT cassette loading apparatus illustrated in FIG. 14.
Figure 18:
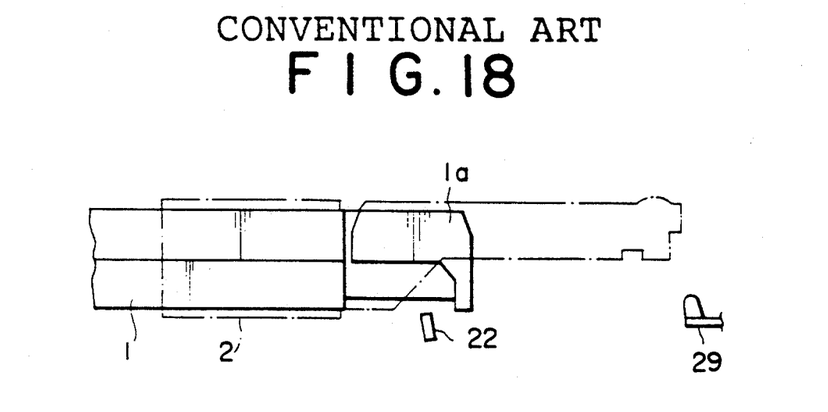

At this time, the first and the second guide pins 8a and 8b of the cassette holder 22 are located at an end portion of a substantially horizontal section of the first and the second guide slots 6a and 6b, respectively, and the third guide pin 8c of the cassette holder 2 is located at an end portion of a substantially horizontal section of the third guide slot 6c. The link lever 23 connected to the cassette holder 2 through the third guide pin 8c causes the release lever 19 connected thereto through the link pin 21 extending through the link slot 24 to be rotated downward (see FIGS. 17 and 18).

After that, when the cassette 1 is manually pushed with a force stronger than that when the cassette 1 is inserted, the slide lever 3 abuts against a start switch (not shown) to rotate the synchronous gear 16, whereby the arm gear 13 engaging the synchronous gear 16 is rotated and the first and the second guide pins 8a and 8b move along the horizontal sections of the first and the second guide slots 6a and 6b, respectively, and the cassette 1 together with the cassette holder 2 are moved deeper into the frame 4.

Figure 19:
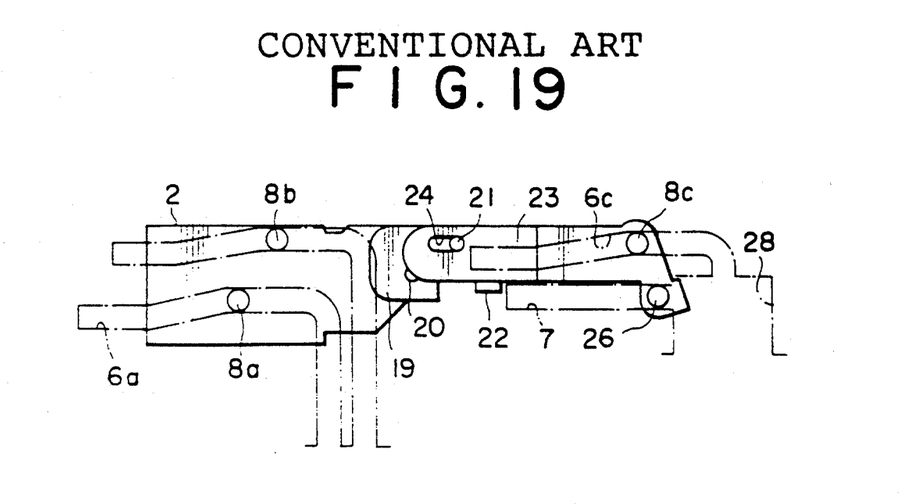
Figure 20:
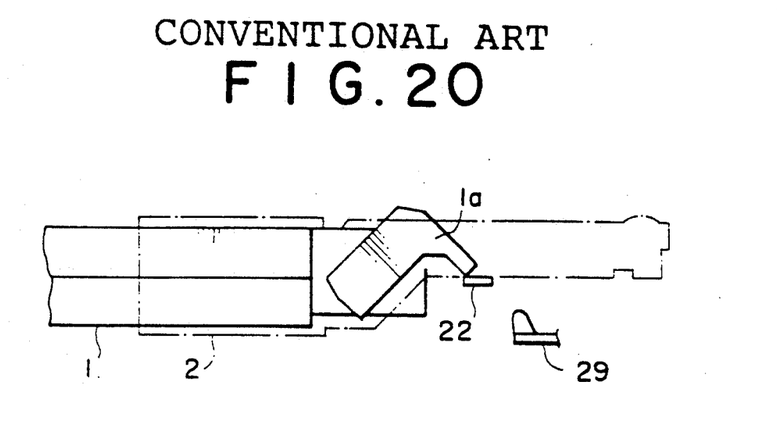

At this time, the third guide pin 8c also moves along the horizontal section of the third guide slot 6c and the link lever 23 proceeds deeper into the frame 4 as the third guide pin 8c moves. During this movement, the link lever 23 is rotated clockwise about the third guide pin 8c in the same direction as the direction of action of the spring 27 due to the shift of the relative position between the third guide pin 8c and the opening-closing guide pin 26. Also, in response to the clockwise rotation of the link lever 23, the release lever 19 rotates counterclockwise until the pawl portion 22 of the release lever 19 abuts against the end face of the cassette holder 2, and the lid 1a is opened by a predetermined amount (see FIGS. 19 and 20).

Figure 21:
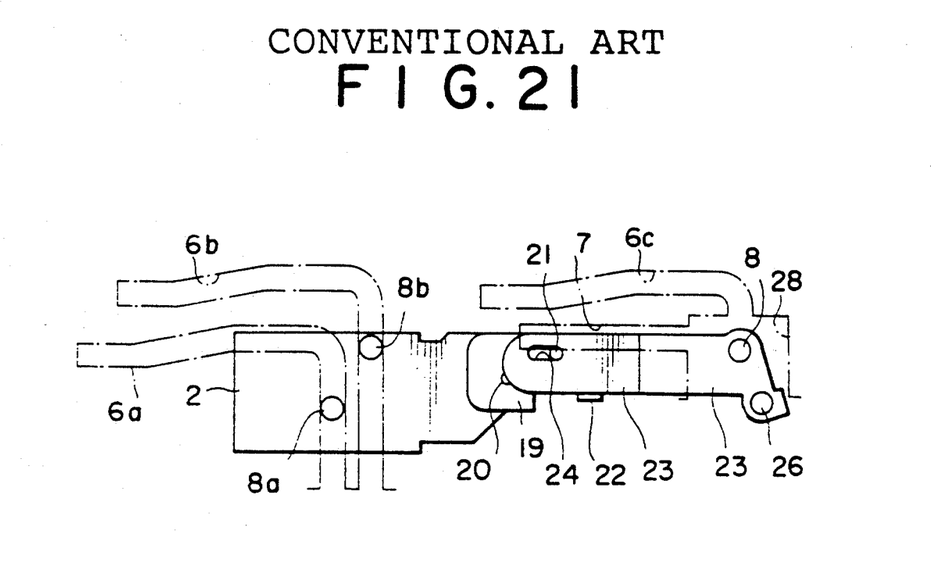

Then, as the first and the second guide pins 8a and 8b move downward along the vertical sections of the first and the second guide slots 6a and 6b, respectively, as illustrated in FIG. 21, the cassette 1 and the cassette holder 2 move downward as a unitary body until the cassette 1 is mounted in a predetermined position. During this downward movement, the lid 1a, opened by a predetermined amount when abutting against the pawl portion 22, additionally abuts against a release tab 29, whereupon the lid 1a is fully opened.

The biasing force of the spring 27 for opening the lid 1a through the release lever 19 is greater than the spring force of the spring (not shown) within the cassette 1 for closing the lid 1a, so that the lid 1a is maintained in a partially opened state by the pawl portion 22. Therefore, even when the third guide pin 8c and the opening-closing guide pin 26 are both positioned in the release slot 28, the lid 1a is maintained in the partially opened state.

During the movement of the cassette 1 from the loading position to the insertion position, the cassette 1, the cassette holder 2 and the slide lever 3 together move in a direction opposite to the direction discussed above. Also, during the movement of the cassette 1, the link lever 23 is forced to rotate in the counterclockwise direction by the shift of the relative position between the third guide pin 8c within the third guide slot 6c and the opening-closing guide pin 26 within the opening-closing guide slot 7 against the rotational force of the link lever 23 spring biased in the clockwise direction by the spring 27, upon which the release lever 19 is rotated clockwise about the pivot pin 20 to release the abutment between the pawl portion 22 and the lid 1a, allowing the lid 1a to close by a closing spring force of the spring within the cassette 1.

In the conventional DAT cassette loading apparatus as described above, while the opening-closing lever is forcedly rotated as the cassette holder 2 moves to enable the lid 1a of the cassette 1 to be reliably opened and closed, possible that the cassette 1 may be subjected to a heavy mechanical shock upon its movement between the loading position and the insertion position, as a result at which the lid 1a will be jarred out of engagement with the pawl portion 22 of the release lever 19. In this case, the lid 1a closes as soon as it is disengaged from the pawl portion 22, and the pawl portion 22 will then abut against the lid 1a upon the rotation of the release lever 19 to impede the further rotation of the release lever 19 as well as the rotation of the link lever 23 interconnected to the release lever 19, whereupon the relative position between the third guide pin 8c and the opening-closing guide pin 26 become rigid and the cassette holder 2 cannot be moved in the direction toward the insertion position of the cassette 1, so that there was a disadvantage that the cassette 1 cannot be ejected.

SUMMARY OF THE INVENTION

Accordingly, one object of the present invention is to provide a cassette loading apparatus free from the above-discussed problems.

Another object of the present invention is to provide a cassette loading apparatus in which, even when a lid disengages from the release lever and is closed during the cassette loading operation, the cassette is ensured to be moved to a cassette insertion position whereupon the cassette can be ejected.

Another object of the present invention is to provide a cassette loading apparatus which is reliable in operation.

A further object of the present invention is to provide a cassette loading apparatus which is simple in structure and reliable in operation.

With the above objects in view, the cassette loading apparatus of the present invention comprises a frame having a pair of side walls having formed therein guide slot means and an opening-closing slot, a cassette holder movably disposed within the frame for receiving therein a cassette including a lid biased into a closed position, and guide pin means extending from the cassette holder to extend through and movable along the guide slot means formed in the side walls of the frame. A pivotable release lever is also disposed on the cassette holder and has an engaging pawl for engaging the lid of the cassette to open and close the cassette lid. Rotatably mounted to the guide pin means and operatively connected to the release lever is a link lever which has an opening-closing guide pin extending into and movable along the opening-closing guide slot for pivotally moving the release lever to open and close the cassette lid. The cassette loading apparatus also comprises a resilient guide means disposed along the opening-closing guide slot in the side wall of the frame and having a yieldable arm for resiliently engaging and guiding the opening-closing guide pin. The resilient guide means has a resiliency sufficient for guiding the opening-closing guide pin during normal operation but sufficient for being flexed by the opening-closing guide pin to allow the link lever and the release lever to rotate when the cassette lid accidentally disengages from the release lever to allow the cassette to be removed from the cassette holder.

The resilient guide means may comprise a coil spring having a coil portion, a first arm portion extending from the coil portion and a second arm portion extending from the coil portion, and the first arm portion is disposed to extend along the opening-closing guide slot. The opening-closing guide slot may have formed therein a relief recess in which the opening-closing guide pin is received when the yieldable first arm portion of the coil spring is flexed by the opening-closing guide pin. The wall of the frame may comprise engaging tabs for mounting the coil spring thereon, and the coil portion of the coil spring is wound around one of the engaging tabs and the first and the second arms resiliently engage other engaging tabs.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

Figure 1:
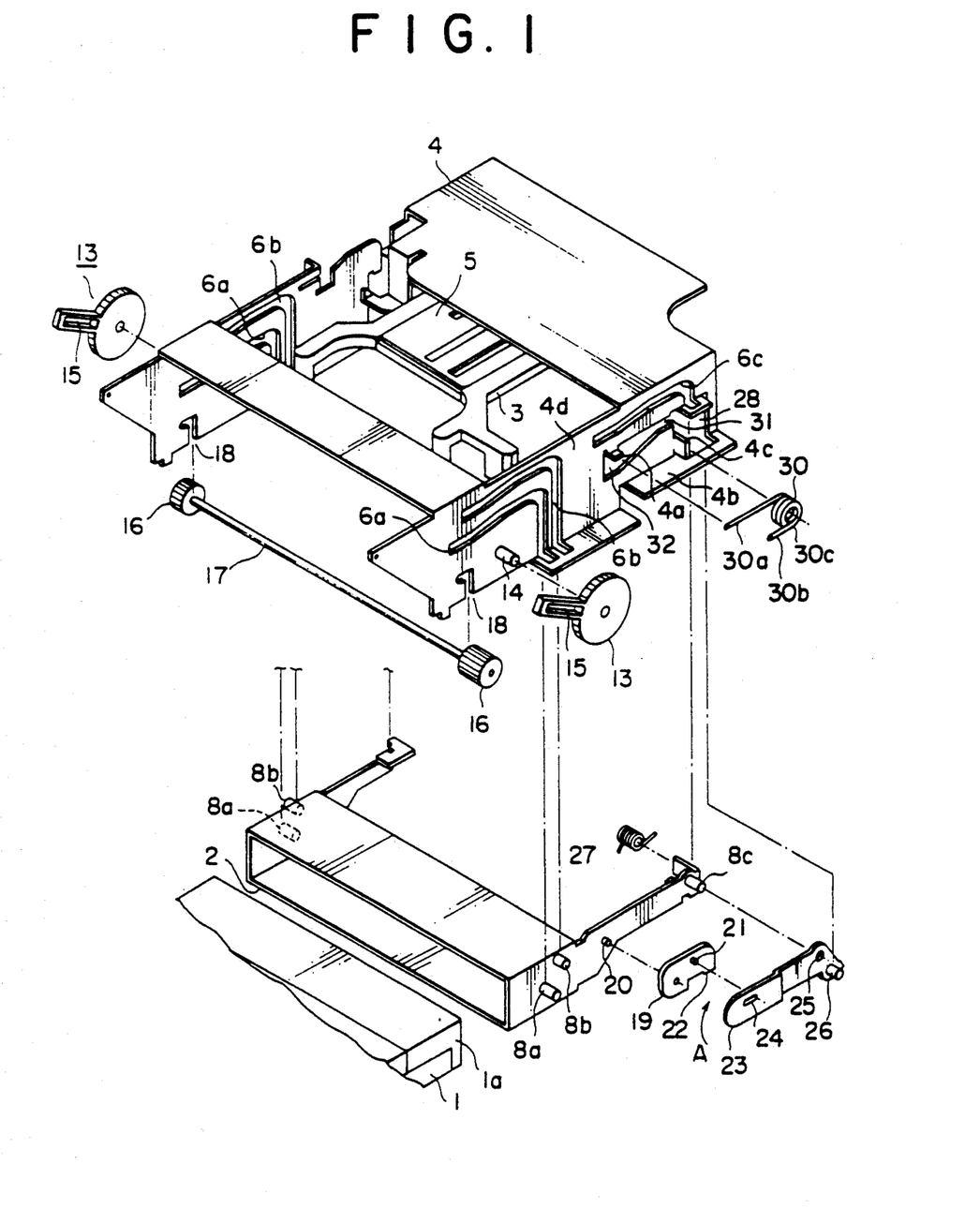
FIG. 1 is an exploded perspective view of a main portion of one embodiment of the cassette loading apparatus of the present invention.
Figure 2:
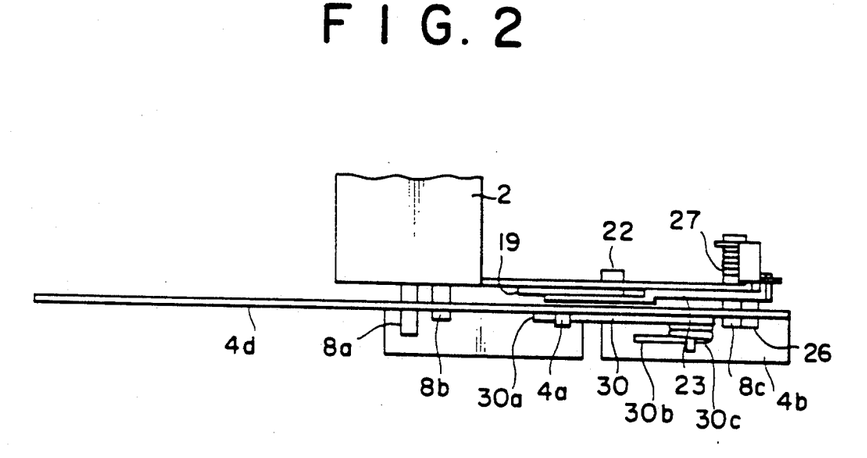
FIG. 2 is a plan view of the main portion of the cassette loading apparatus illustrated in FIG. 1.
Figure 3:
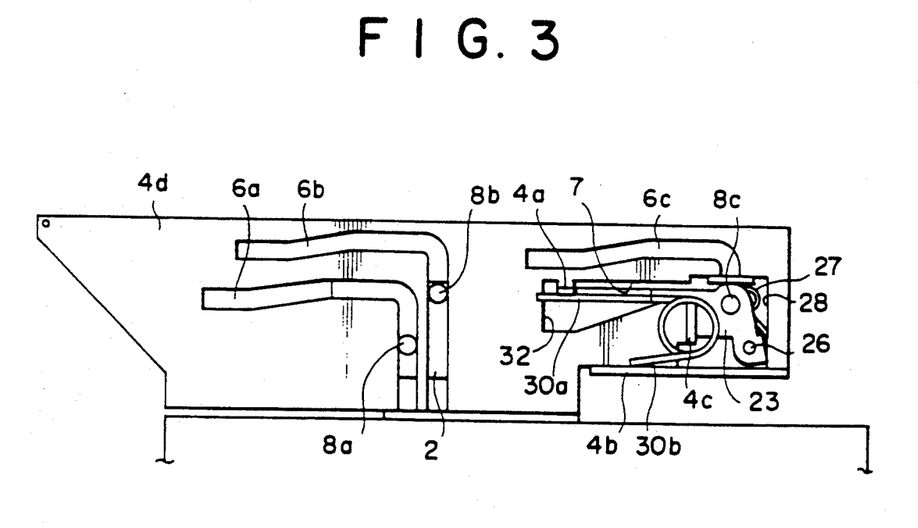
FIG. 3 is a side view of the main portion of the cassette loading apparatus illustrated in FIG. 2.

FIGS. 1 to 3 are views illustrating one embodiment of the DAT cassette loading apparatus of the present invention, in which the components identical or corresponding to those illustrated in FIGS. 14 to 21 in conjunction with the conventional design are designated by the same reference characters and their explanations will be omitted.

Figure 12:
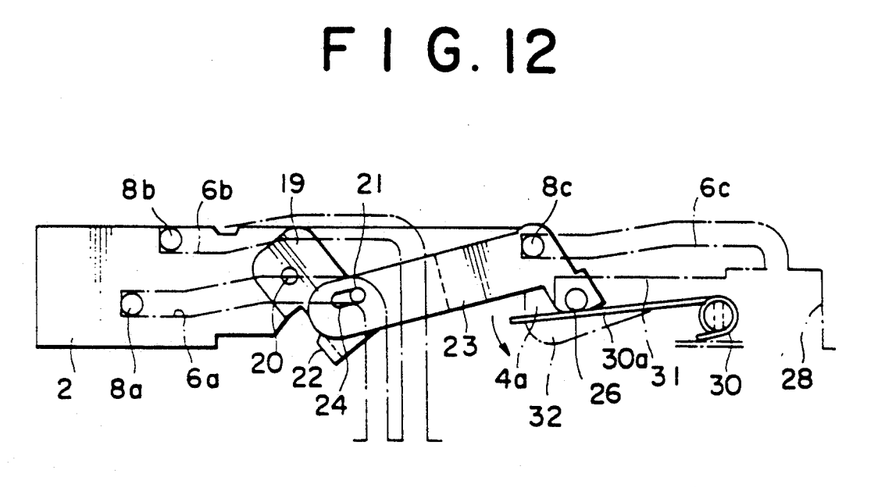

In the figures, 30 is a coil torsion spring having a first arm portion 30a, a second arm portion 30b and a coil portion 30c. The coil portion 30c is mounted on an engage tab portion 4c projecting from a side wall 4d of the frame 4 in the vicinity of the release hole 28. A tip of the first arm portion 30a of the coil torsion spring 30 engages a first stopper tab 4a formed on the side wall of the frame 4, and a tip of the second arm portion 30b of the coil torsion spring 30 engages a second stopper 4b also integrally extending from the side wall of the frame 4. As will be described later, the coil torsion spring 30 acts on the link lever 23 to rotate it counterclockwise, which is opposite to the direction of urge of the spring 27 acting on the link lever 23, when the opening-closing guide pin 26 on the link lever 23 is engaged by the first arm portion 30a of the coil spring 30 as illustrated in FIG. 12. The spring force of the coil torsion spring 30 is greater than the spring force of the spring 27, and the arm portion 30a usually functions as a rigid body. 31 is an opening-closing guide slot formed below the guide slot 6c and having a relief portion 32 in addition to the release slot 28.

Next, the operation of the DAT cassette loading apparatus as described above will now be described. Upon loading the cassette 1, the cassette 1 is first inserted into the cassette holder 2 until it abuts against the tip portion of the slide lever 3 and held in the cassette holder 2.

Figure 4:
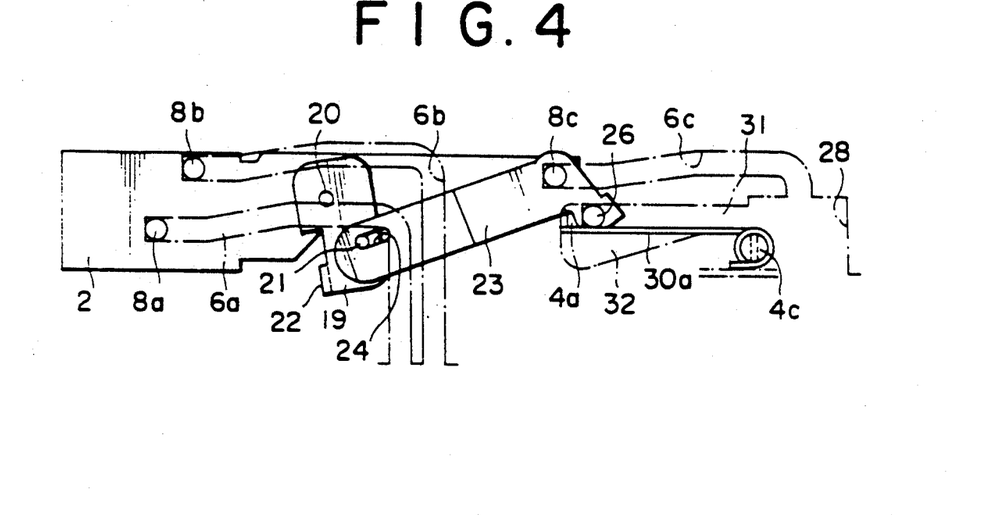
FIGS. 4 to 13 are side views illustrating various operating positions of the main portion of the DAT cassette loading apparatus of FIG. 1.
Figure 5:
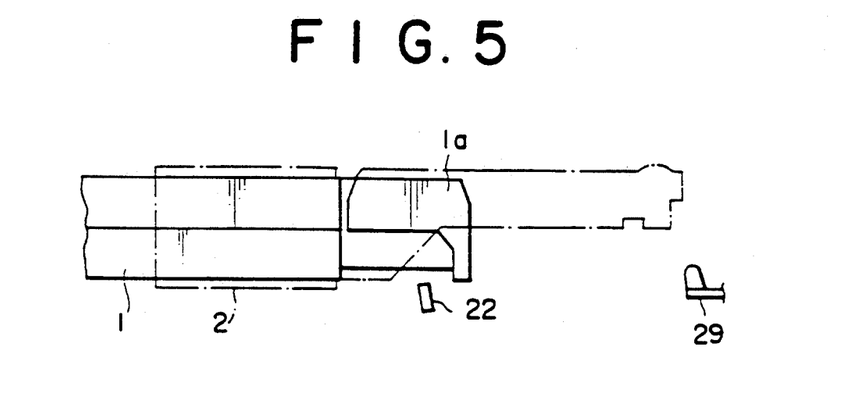

At this time, the first and the second guide pins 8a and 8b of the cassette holder 2 are located at an end portion of the substantially horizontal sections of the first and the second guide slots 6a and 6b, respectively, and the third guide pin 8c of the cassette holder 2 is located at an end portion of the substantially horizontal section of the third guide slot 6c. The link lever 23 connected to the cassette holder 2 through the third guide pin 8c causes the release lever 19 connected thereto through the link pin 21 extending through the link slot 24 to be rotated downward (see FIGS. 4 and 5).

After that, when the cassette 1 is manually pushed with a force stronger than that when the cassette 1 is inserted, the slide lever 3 abuts against a start switch (not shown) to rotate the synchronous gear 16, whereby the arm gear 13 engaging the synchronous gear 16 is rotated and the first and the second guide pins 8a and 8b move along the horizontal sections of the first and the second guide slots 6a and 6b, respectively, and the cassette 1 and the cassette holder 2 are moved deeper into the frame 4.

Figure 6:
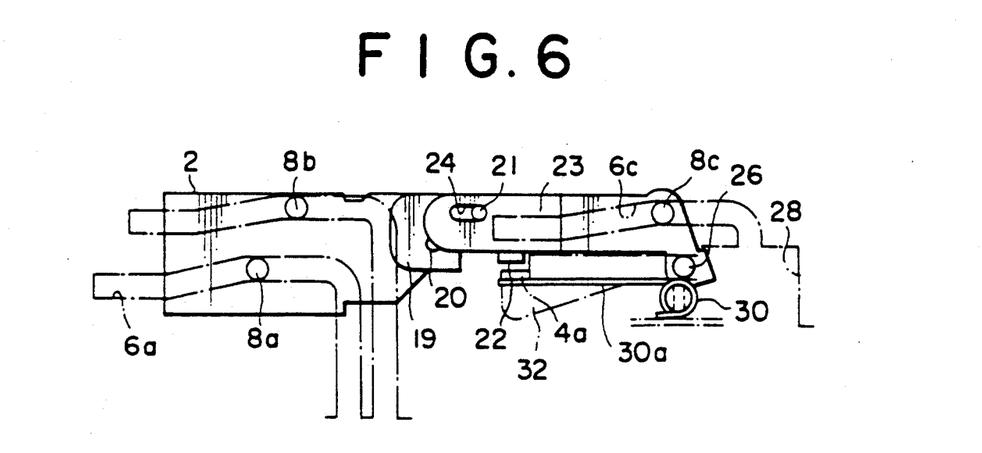
Figure 7:
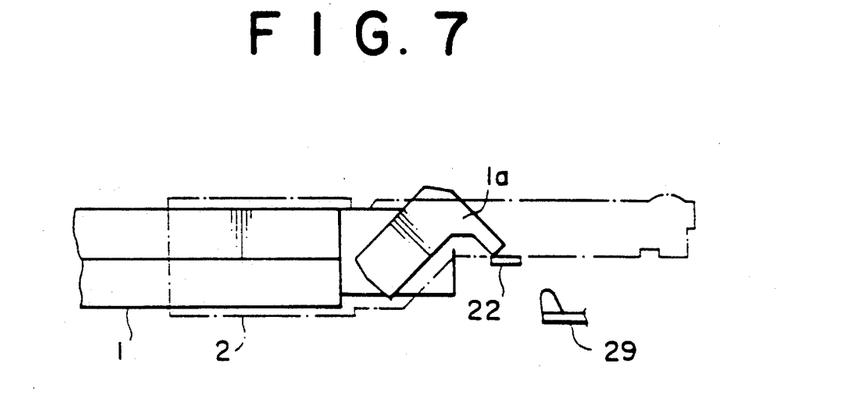

At this time, the third guide pin 8c also moves along the horizontal section of the third guide slot 6c and the link lever 23 proceeds deeper into the frame 4 as the third guide pin 8c moves along the horizontal section of the third guide slot 6c. During this movement, the link lever 23 is rotated clockwise about the third guide pin 8c because the opening-closing guide pin 26 of the link lever 23 engages the relatively hard first arm 30a of the coil torsion spring 30, so that the opening-closing guide pin 26 is not allowed to move into the relief portion 32. The link lever 23 is rotated clockwise about the third guide pin 8c in the same direction as the direction of action of the spring 27 due to the shift of the relative position between the third guide pin 8c and the opening-closing guide pin 26. Also, in response to the clockwise rotation of the link lever 23, the release lever 19 rotates counterclockwise until the pawl portion 22 of the release lever 19 abuts against the end face of the cassette holder 2, and the lid 1a is opened by a predetermined amount (see FIGS. 6 and 7).

Figure 8:
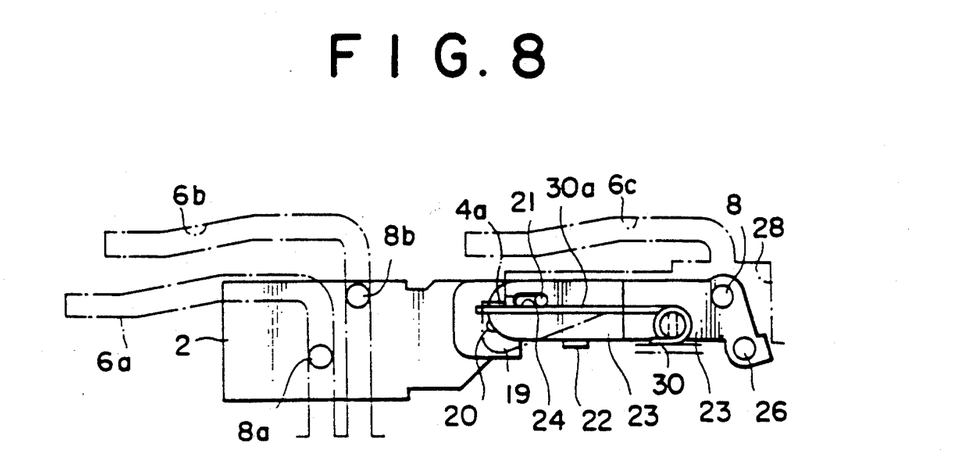

Then, as the first and the second guide pins 8a and 8b move downward along the vertical sections of the first and the second guide slots 6a and 6b, respectively, as illustrated in FIG. 8, the cassette 1 and the cassette holder 2 move downward as a unitary body until the cassette 1 is mounted in a predetermined position. During the downward movement, the lid 1a, opened by a predetermined amount when abutting against the pawl portion 22, additionally abuts against a release tab 29, whereupon the lid 1a is fully opened.

During the movement of the cassette 1 from the loading position to the insertion position, the cassette 1, the cassette holder 2 and the slide lever 3 move in a direction opposite to the direction discussed above. Also, during the movement of the cassette 1, the link lever 23 is forced to rotate in the counterclockwise direction by the shift of the relative position between the third guide pin 8c within the third guide slot 6c and the opening-closing guide pin 26 within the opening-closing guide slot 7 against the rotational force of the link lever 23 spring biased in the clockwise direction by the string 27, upon which the release lever 19 is rotated clockwise about the pivot pin 20 to release the abutment between the pawl portion 22 and the lid 1a, allowing the lid 1a to close by a closing spring force of the spring within the cassette 1.

Figure 9:
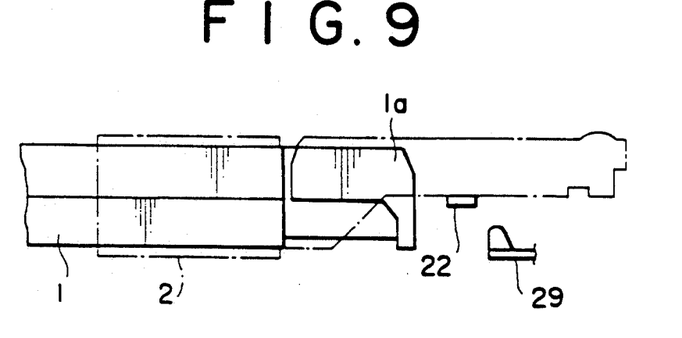
Figure 10:
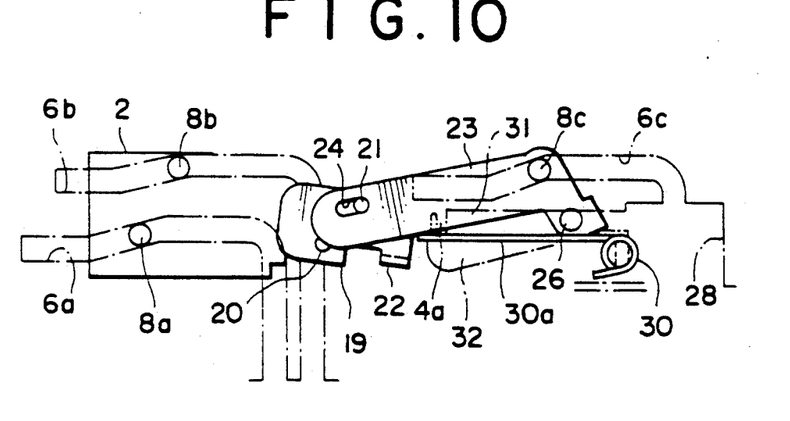
Figure 11:
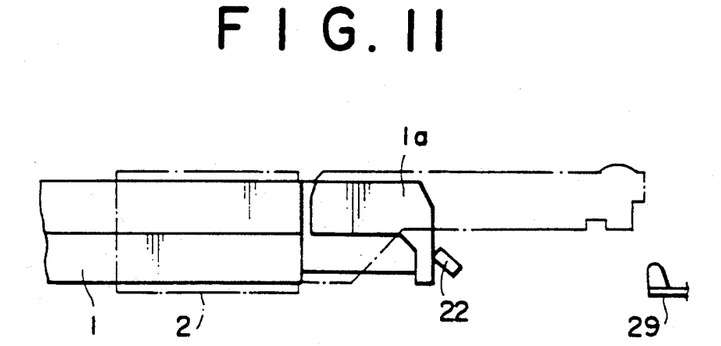

When the DAT apparatus is subjected to a significant mechanical shock during the movement of the cassette 1 from the insertion position to the loading position and the lid 1a disengages from the pawl portion 22 of the release lever 19, the lid 1a immediately closes due to the closing spring (not shown) in the cassette 1 (see FIG. 9). At this time, it is not possible to shift into the tape loading operation mode because the lid 1a is closed, and a sensor (not shown) which detects the closure of the lid 1a provides a signal which causes the synchronous gear 16 to rotate in the reverse direction, whereby the cassette 1 is brought into the operation for returning the cassette 1 to the insertion position. During this movement, when the release lever 19, rotates clockwise and its pawl portion 22 abuts against the lid 1a, the clockwise rotation of the release lever 19 is stopped (see FIGS. 10 and 11). As a result, the link lever 23 interlocked with the release lever 19 is also prevented from being rotated, so that the relative position between the third guide pin 8a and the opening-closing guide pin 26 become rigid. Under such circumstances, the cassette holder 2 must be further moved toward the insertion position of the cassette 1 in order to be able to eject the cassette from the apparatus. Therefore, the opening-closing guide pin 26 moves further within the slot 31, causing the first arm portion 30a of the coil torsion spring 30 to flex counterclockwise against the biasing force of the coil torsion spring 30 until the cassette holder 2 reaches the insertion position of the cassette 1 upon which the opening-closing guide pin 26 is accommodated within the relief portion 32 of the opening-closing guide slot 31 (see FIG. 12).

Figure 13:
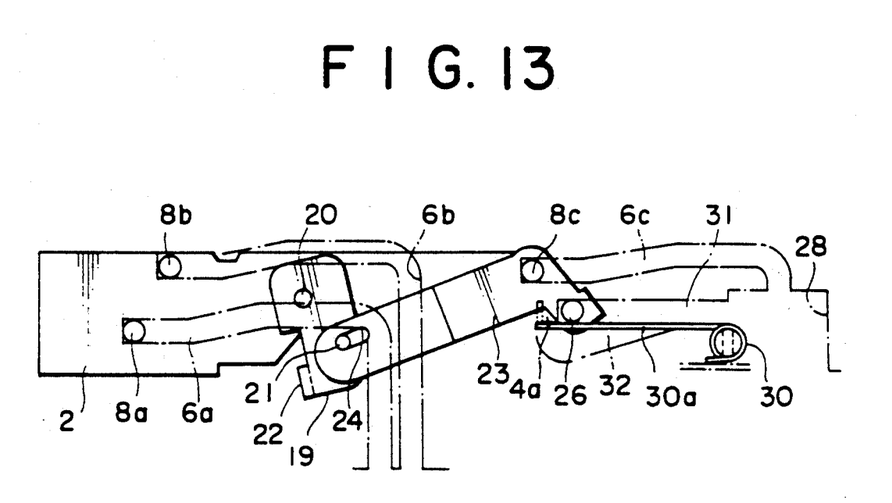

When the cassette 1 is pulled out of the cassette holder 2, the lid 1a and the pawl portion 22 of the release lever 19 are disengaged, the link lever 23 is rotated counterclockwise by the action of the coil torsion spring 30, and the tip portion of the coil torsion spring 30 engages the first stopper 4a. Simultaneously, the release lever 19 rotates clockwise and the cassette holder 2 is brought into a position in which the cassette 1 can be inserted (see FIG. 13).

While the above description has been made in terms of an embodiment of a cassette loading apparatus for the DAT, the present invention is also applicable to an apparatus employing a cassette containing a video tape, a magnetic disc or an optical disc.

As has been described above, the cassette loading apparatus of the present invention has advantages in that, since a spring having an arm portion which engages the opening-closing guide pin for guiding the opening-closing guide pin is provided in the vicinity of the link lever, the cassette holder can be moved into the cassette insertion position and the cassette is ensured to be ejected from the cassette holder even when the lid disengages from the release lever during the time that the lid is being opened and closed by the release lever.

What is claimed is:

1. A cassette loading apparatus comprising:
   a frame having a pair of side walls having formed therein guide slot means and an opening-closing guide slot;
   a cassette holder movably disposed within said frame for receiving therein a cassette including a lid biased into a closed position;
   guide pin means extending from said cassette holder to extend through and movable along said guide slot means formed in said side walls of said frame;
   a release lever pivotally disposed on said cassette holder and having a pawl portion for engaging said lid of said cassette to open and close said cassette lid;
   a link lever rotatably mounted on said guide pin means and operatively connected to said release lever, said link lever having an opening-closing guide pin extending into and movable along said opening-closing guide slot for pivotally moving said release lever to open and close said cassette lid; and
   resilient guide means, disposed along said opening-closing guide slot in said side wall of said frame, having a yieldable arm for resiliently engaging and guiding said opening-closing guide pin, said yieldable arm having a resiliency which allows said opening-closing guide pin to be guided along said opening-closing guide slot during normal operation and which also allows said resilient guide means to be flexed by said opening-closing guide pin to allow said link lever and said release lever to rotate when said cassette lid accidentally disengages from said release lever to allow said cassette to be removed from said cassette holder.

2. A cassette loading apparatus as claimed in claim 1, wherein said opening closing guide slot has formed therein a relief recess in which said opening-closing guide pin is received when said yieldable arm of said resilient guide means is flexed by said opening-closing guide pin.

3. A cassette loading apparatus as claimed in claim 1, wherein said resilient guide means comprises a coil spring having a coil portion, a first arm portion extending from said coil portion and a second arm portion extending from said coil portion, said first arm portion being disposed to extend along said opening-closing guide slot, and said opening-closing guide slot has formed therein a relief recess in which said opening-closing guide pin is received when said yieldable first arm portion of said coil spring is flexed by said opening-closing guide pin.

4. A cassette loading apparatus as claimed in claim 1, wherein said resilient guide means comprises a coil spring having a coil portion, a first arm portion extending from said coil portion and a second arm portion extending from said coil portion, said first arm portion being disposed to extend along said opening-closing guide slot.

5. A cassette loading apparatus as claimed in claim 4, wherein said side wall of said frame comprises engaging tabs for mounting said coil spring thereon.

6. A cassette loading apparatus as claimed in claim 5, wherein said coil portion of said coil spring is wound around one of said engaging tabs and said first and said second arms resiliently engage other engaging tabs.

* * * * *